(12) United States Patent
Kumar (10) Patent No.: US 6,353,823 B1
(45) Date of Patent: Mar. 5, 2002

(54) METHOD AND SYSTEM FOR USING ASSOCIATIVE METADATA

(75) Inventor: Aruna Kumar, Camas, WA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/264,425

(22) Filed: Mar. 8, 1999

(51) Int. Cl.[7] ............................................. G06F 17/30
(52) U.S. Cl. ........................ 707/3; 707/102; 707/103; 707/104
(58) Field of Search ................................ 707/3, 5, 102, 707/104, 103; 717/1

(56) References Cited

U.S. PATENT DOCUMENTS

| | | | | |
|---|---|---|---|---|
| 5,832,499 A | * | 11/1998 | Gustman | 707/103 |
| 5,907,704 A | * | 5/1999 | Gudmundson et al. | 717/1 |
| 6,161,107 A | * | 12/2000 | Stern | 707/104 |
| 6,167,405 A | * | 12/2000 | Rosensteel, Jr. et al. | 707/102 |
| 6,199,060 B1 | * | 3/2001 | Gustman | 707/3 |

\* cited by examiner

*Primary Examiner*—Diane D. Mizrahi
(74) *Attorney, Agent, or Firm*—Kenyon & Kenyon (57) ABSTRACT

A method and system are disclosed for storing a file to enable searching, where the file is stored in a set of files, a set of context information is extracted from the file and from the process of storing the file, the context information is stored in a set of associative information, and a reference to the file is stored in the set of associative information.

17 Claims, 7 Drawing Sheets

METHOD AND SYSTEM FOR USING ASSOCIATIVE METADATA

BACKGROUND OF THE INVENTION

I. Field of the Invention

This invention relates to storing and searching for files on a computer system.

II. Background Information

Computer systems typically maintain images, documents, applications and other collections of data as files. Files are typically maintained on a hard disk drive associated with a computer; however, files may also be maintained in memory, on floppy drives, remote servers, or other types of mass storage media. Files are typically stored dispersed among numerous directories or folders. Each directory or folder may have sub-directories or sub-folders. A computer system may contain hundreds of such directories or folders, and file servers which may be a part of a computer system may have thousands of such directories or folders. A user usually locates a file by using the file's filename (typically a short character string, e.g., "family.img"); a disk drive designation and directory or folder may be prepended to the filename. While an attempt may be made to make filenames descriptive, it is virtually impossible to provide an adequate description for a file, in particular a file containing an image, in a short filename.

As used herein, a file may contain any combination of image information, text information or other information. A file may be, for example, a text document, a web page, an image, a legal decision or any other collection of text and data. The term file may include and be used interchangeably with the contents of a file.

Images are commonly stored on personal computer systems for use in presentations, documentation, artwork and other documents, for personal use (e.g., digitized photographs of family members), for use in the computer operation itself (e.g., icons and screen savers) and for other uses. These images are digitized, stored and displayed in standard formats such as .gif (graphical interface format), .bmp (bitmap format), .tif (tagged image file format) and .jpg (JPEG format). Images are typically represented on a computer display as a matrix of pixels of various colors and intensities and may be printed to paper, transmitted to other computer systems, stored, and associated with documents or applications.

Images or other files may be stored in a central location, such as an image database. However, it is impractical to centralize image storage to allow for searching, as different applications often have storage location requirements for files (e.g., storing files either near to or in separate directories from applications or application data) and users may store files in various locations. Certain computer applications associate files with documents, presentations or other files produced by those applications. When associated in this manner, the filename for the associated file may be cryptic, and may be significant only to the application which is able to access and manipulate the files. Furthermore, the lack of descriptiveness in filenames makes even centrally stored files difficult to locate.

Another complication to the task of searching for images is their nature. Images are not amenable to verbal descriptions which can be used as search criteria by a computer, and are better categorized using feature recognition techniques. While humans are very good at by the task of feature recognition, it is impractical to search for an image file by having a person open, display and interpret each of the thousands of images in an image database.

Computer based feature recognition techniques exist, and may be used to search for images or other types of files stored on a computer system, but these techniques are imperfect, often focus on narrow aspects of an image as opposed to an image's holistic aspects, and are unable to translate an image into the brief verbal descriptions which humans may use to categorize images. For instance, a computer based feature recognition module may recognize general information, textures, or hues, whereas a person would recognize an object (i.e., a rose in a vase). After analyzing a picture a computer may recognize a quality such as "bluish" where a person would generate a phrase such as "cloudless sky." Feature recognition modules may recognize particular faces, but require a reference image, and are thus incapable of converting a verbal description ("a photo of the owner of this computer system as a child") to a searchable criteria. Feature recognition modules may be incapable of recognizing, for example, a particular object from any of a number of angles.

Furthermore, current file search systems (searching for, for example, images) using feature recognition technology may not allow for feature recognizers to be used both selectively and with weightings. For example, current techniques do not allow a user to minimize the importance of the recognition of some features, emphasize the recognition of other features, and eliminate the consideration of still others.

When images, text documents and other information are stored in a file on a computer system by a person, the reference information the person uses to describe the file is information such as the source, content, and storage or generation date of the document, and the application associated with the document. Conventional storage methods, indexing files by filename and location, and searching using techniques such as feature extraction, record no contextual information relevant to the user or the circumstances of the storage; the search is not user-centric. Two different users, having two different sets of user-centric search criteria, are unable to express these criteria using current methods. Thus the two users use the same file search information (e.g., a sample reference image) and have the same results returned. Current systems do not allow a user to search for a file or image based on a combination of information such as file content, file creation, file source, an application or document associated with the file, a summary of the file, or other contextual information.

Therefore there exists a need for a method and system allowing a disparately stored set of files containing, for example, documents or images, to be stored in a way allowing a search based on different criteria at different times and a search where a user may emphasize certain criteria. There is a need to allow files to be searched and indexed without relying on imperfect feature extraction techniques. There is a need to allow files to be indexed based on a disparate range of information, such as source, content, creation context, and relevance to a user, and to allow a user to locate such files without the need to record a filename or location. There is a need to allow a user to tailor the criteria used in a file search, and to dictate which criteria are and which are not important in the search for a certain file.

SUMMARY OF THE INVENTION

A method and system are disclosed for storing a file to enable searching, where the file is stored in a set of files, a set of context information is extracted from the file and from the process of storing the file, the context information is stored in a set of associative information, and a reference to the file is stored in the set of associative information.

DETAILED DESCRIPTION

I. Overview

An exemplary embodiment of the present invention allows for a set of files which are stored over various locations on a computer system to be searched over using information which a person uses naturally to describe files. Such information may be a combination of the context surrounding the storage of the files, user-centric information such as a user description, and information stored in the files themselves. The files may contain image or text data, or other information. The system and method create associative information, metadata allowing for a search for files. When used herein, associative information is information associated with a file, describing one or more aspects of the file, the context of the file or the file's storage and/or creation, and the relevance of the file to a user. Metadata refers to information which may be used to describe, search in, or otherwise analyze a set of data or documents. Context information may include information on the storage of a file (such as the date, the source, the application used to store the file, or other information), information on the file itself (such as a title, location, user summary, or other information), or other information describing aspects of the file.

The associative information of an embodiment of the present invention allows a user to use information a person naturally associates with a file to search for that file. For example, a user may wish to search for "the image I used with the presentation made in October."

An exemplary embodiment of the present invention uses a storage module to create associative information on images stored in files. When used herein image may mean a file storing an image. A user may use a search module to search for the stored image using the associative information. The associative information for each image stored using the system is kept in an associative information file; the collection of associative information files is stored in a metadata file index, a central repository of such associative information.

In an exemplary embodiment an image enters a computer system via an application program, such as an E-mail program, which has been registered with the storage module. The application program sends information on the image to the storage module. The user does not need to initiate the process or record the image filename. In addition, the user may use the storage module to input an image. The storage module may automatically generate associative information, and may accept user generated associative information. Feature extractors may be run on the image, returning ratings ("absolute values") modified by user entered preferences; all such ratings are stored in a feature index. The filename for the image and all associative information are stored in an associative information file.

When storing an image, the system and method of the present invention allow a user to select a portion of the image which may be relevant to the user for later searching; the user may also select which features (e.g., color, the presence of a face) are relevant to the characterization of that portion for search purposes. This follows the way that humans view and process images: by looking only at a relevant portion and by focusing on and remembering only certain features, where the relevant features vary from image to image.

The system and method create a single index holding associative information describing the various images stored on a computer system in ways relevant to the user of the system. The actual image files may be stored in disparate places on the computer system; the index holds information referencing the actual file.

In an exemplary embodiment a search module allows searching on images which have been indexed using the storage module. A user inputs a query to the search module; the query may include associative information, feature extractor preferences, and inputs to feature extractors. For each image, the search module generates a query rating, and a ranked list of references to images are returned. The user may search for an image using queries relevant to the user: a user-centric search. For example, a user may remember the name of the person who sent a document to the user via E-mail, but may not remember the filename or location for the file storing the image. The user may want to search for "That photo I scanned in last January, which has a vivid blue sky."

Embodiments of the present invention may allow for user-centric searches over a set of any sort of files, not only image or text files. The system and method may be used with existing applications and hardware in a computer system.

Since users may enter different associative information as search criteria, and since users may use different preferences causing a search to focus on different features, two searches using the same reference image performed by two separate users may result in different sets of returned documents.

II. Feature Extractors

Feature extractors analyze an image or a file and extract information describing an aspect of the image or document. For example, feature extractors operating on images may extract information about color or texture. Feature extractors operating on text documents may produce a set of keywords likely to describe the document. A feature extractor operating on images may require a segment definition; such a segment definition may be part of the feature extractor output. A segment definition is an indication of the size (in pixels, for example) and shape of a portion of an image.

Some commercially available image storage and retrieval technologies compare and index images based on the overall content of certain hues in an image. With an "RGB" indexing scheme, an image extractor determines the quantities of red, green and blue in an image and returns three values, which may be used to index and search for the image. To evaluate the image, for each color, the RGB feature extractor sums the values of that color contained in each pixel. Three values are returned, one each for red, green and blue. To compare two images, the RGB ratings for each image are compared with each other. Except for visual artists and others trained in the use and manipulation of images, most users of computer imaging do not recognize images in this manner.

Edge feature extractors detect a sudden shift in the color mix, which humans perceive as an edge or boundary. Edge feature extractors may be used by an RGB extractor to eliminate a portion of an image or segment which does not have the same general color mix as a majority of the image. A small portion of an image or segment which has a significantly different color mix than a larger region of the image or segment may be ignored by an RGB feature extractor, as it is likely to be unrelated to the selected feature.

A combined feature extractor may be used to produce an overall description of an image or a rating based on a comparison between two images. A combined feature extractor may include an edge extractor, a color extractor such as an RGB extractor, and possibly other feature extractors to compare or describe images. In such a combined feature extractor an edge extractor may be used to define certain characteristics of an image by evaluating and quantifying edges in a manner allowing for those edges to be compared with edges in other images. Edges evaluated by an edge extractor may evaluate and quantify the border of objects within an image, or may evaluate and quantify features of an image, such as branches in a tree. The quantification of the edges in an image may be combined with the quantification of other features in an image; these numbers may be used to compare the image with other images. Such a combined feature extractor produces either a set of data which represents an overall description of the forms in the image, or, when such a feature extractor compares two images, produces a rating of the similarity of the two images. A combined feature extractor may evaluate an image to decide what extractors are appropriate for evaluating an image.

Such feature extractors may also combine a texture extractor, evaluating an image to produce a rating indicating how rough or smooth the image is. For example, a portion of an image showing a sandy beach may be evaluated as relatively smooth, and a portion of an image showing a brick wall may be evaluated as relatively rough. Combined feature extractors may also include a motion extractor, which detects an object in motion depicted in a still image.

Face extractors exist which, when given an image of a sample face belonging to a particular person, may provide ratings of other images to indicate the likelihood those images contain the face of the given person. For example, a user may provide as an input to a face extractor an image of the face of Abraham Lincoln. The face extractor may then scan a database of images and return those images that are likely to contain the face of Abraham Lincoln. A face extractor also may merely detect the existence of a face in general. When running in such a mode such feature extractors analyze an image and return a value indicating the likelihood that an image contains any human face as opposed to a specific face. Haze or fog feature extractors return the likelihood that an image contains haze or fog.

Numerous types of feature extractors are known and may be used with the system and method of the present invention. Methods of implementing such feature extractors are well known in the art of computer image processing.

III. Structure

Figure 1:
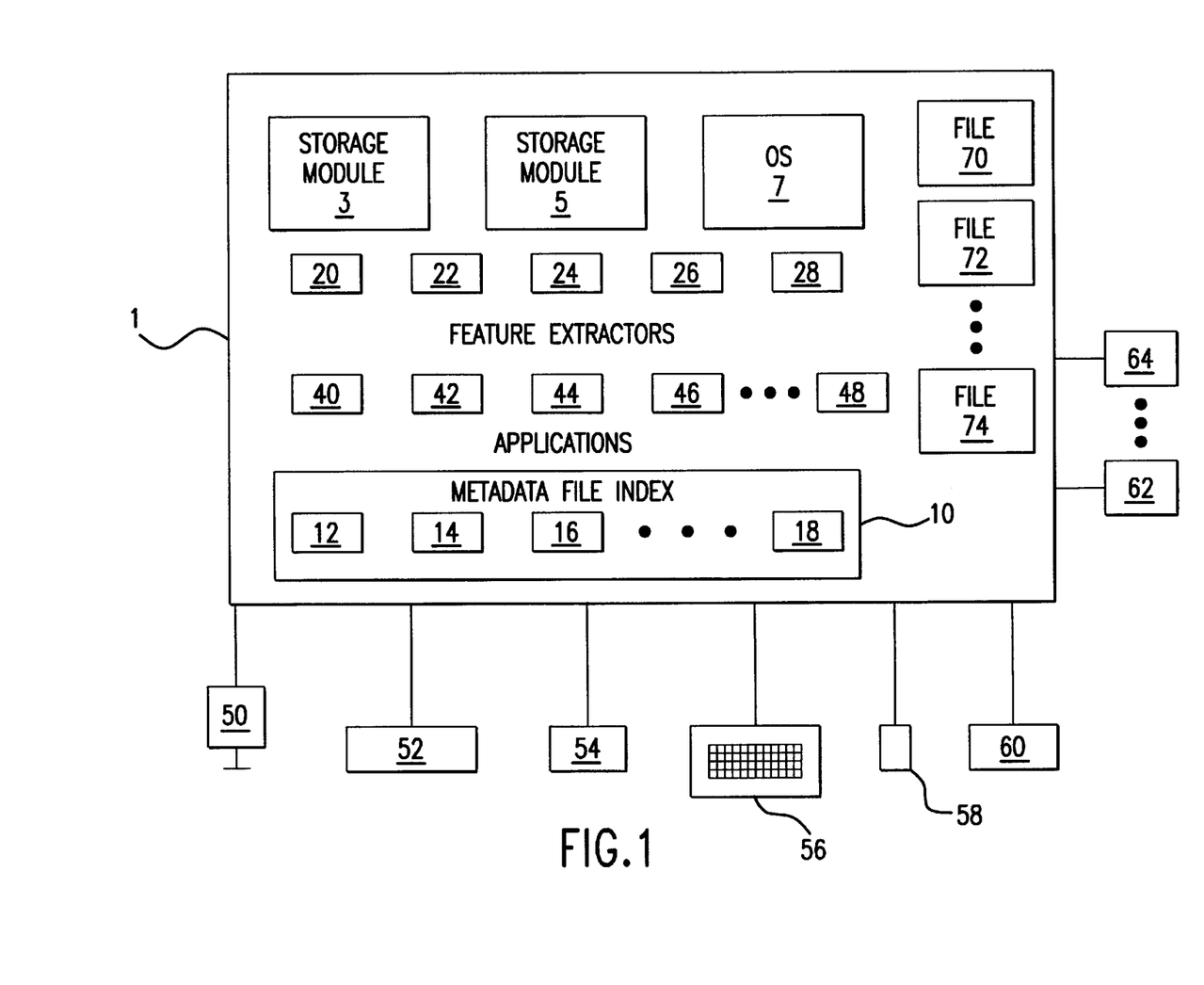
FIG. 1 is a block diagram illustrating a computer system according to an embodiment of the present invention.

Referring to the figures in which like numerals indicate like elements, FIG. 1 is a block diagram illustrating a computer system according to an embodiment of the present invention. Computer system 1 of FIG. 1 includes a set of files including files 70, 72 and 74, containing images or other information, a storage module 3, storing associative information for files, a search module 5, searching for files, a metadata file index 10, containing information used for searching over files 70–74 stored on computer system 1, feature extractors 20, 22, 24, 26, and 28, for evaluating files based on features, an operating system ("OS") 7, providing overall control of computer system 1, application programs 40, 42, 44, 46 and 48, and a plurality of peripheral devices 50, 52, 54, 56, 58, 60, 62 and 64. Computer system 1 may be a standard personal computer or another type of data processing device, and in addition, may include components not traditionally found in a standard personal computer.

Metadata file index 10 includes a plurality of associative information files, 12, 14, and 18, each storing information on a particular file 70–74 stored on computer system 1. Peripheral devices 50–64 include a monitor 50, displaying information to a user, a scanner 52, converting text and graphics in hardcopy (i.e., paper) form to digital form, a modem/network connection 54, interfacing with other computer systems or digital devices, a keyboard 56, allowing a user to input text, a pointing device 58, allowing user input in conjunction with graphical display output to monitor 50, a disk drive 60, providing storage for application programs 40–48, files and other information, and other peripheral devices 62–64. In an exemplary embodiment feature extractors 20–28 include an RGB feature extractor 20, a face extractor 22 (which may run in a general mode, searching for any face, or comparison mode, searching for a specific face), a combined feature extractor 24, a haze feature extractor 26 and a fog feature extractor 28. Pointing device 58 may be, for example, a mouse, or may be another pointing device. In alternate embodiments programs 40–48 need not be stored entirely on computer system 1.

In an exemplary embodiment of the present invention feature extractors are separate modules. Additional feature extractors may be added to computer system 1 to function with storage module 3 and search module 5 with a minimum of alteration to storage module 3 and search module 5.

Figure 2:
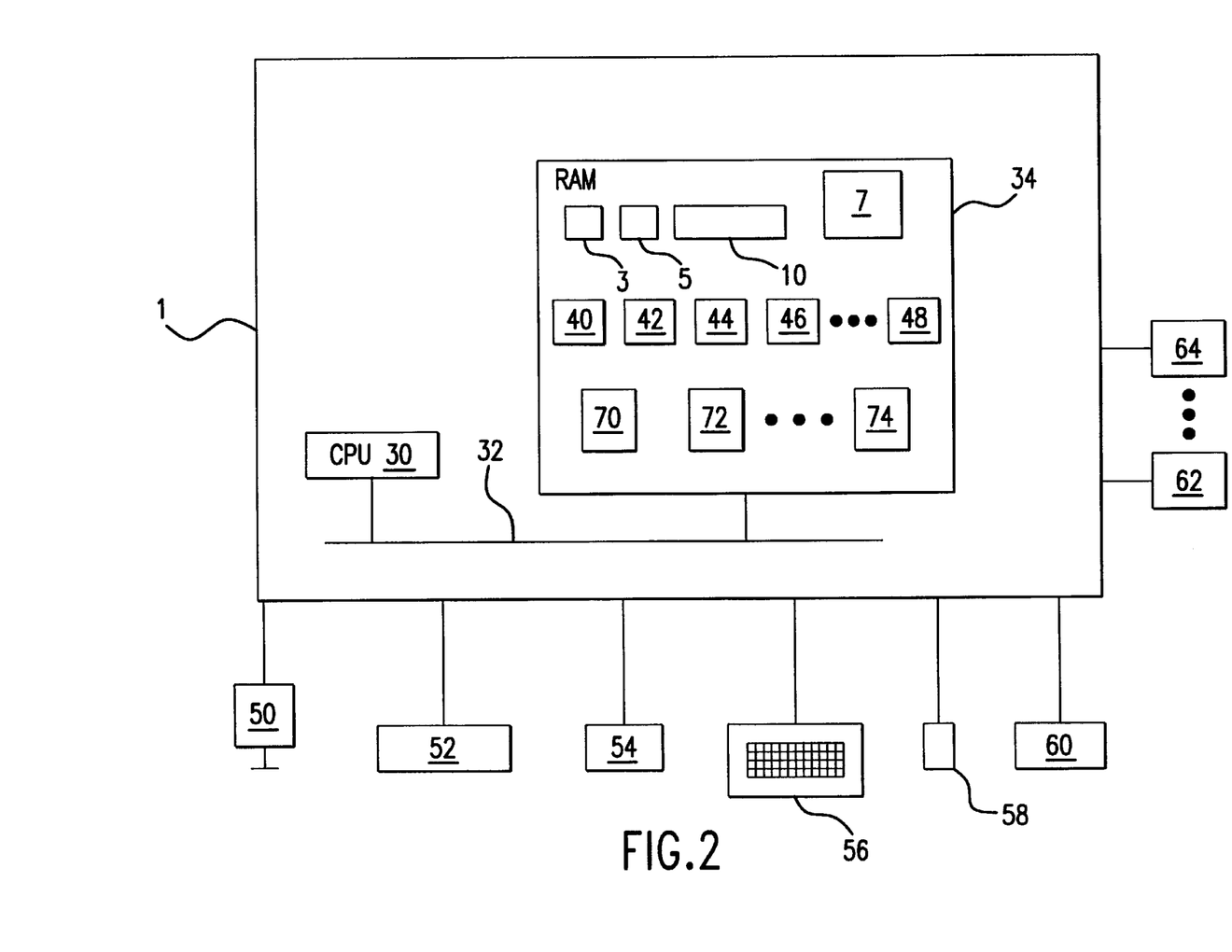
FIG. 2 is a block diagram illustrating the computer system of FIG. 1 according to an embodiment of the present invention.

FIG. 2 is a block diagram illustrating computer system 1 of FIG. 1 according to an embodiment of the present invention. Computer system 1 includes a central processing unit ("CPU") 30 connected to a system bus 32. CPU 30 executes instructions and controls the operation of computer system 1. CPU 30 may be, for example, a Pentium® processor available from Intel® Corp. System bus 32 allows the various components of computer system 1 to communicate, and may alternatively include a plurality of busses or a combination of busses and bus bridge circuits.

Computer system 1 further includes random access memory ("RAM") 34, connected to system bus 32 and providing non-permanent storage of data and program instructions, and a plurality of peripheral devices 50–64. A portion of files 70–74, metadata file index 10, application programs 40–48, storage module 3, search module 5, and OS 7 may be stored in RAM 34, on disk drive 60, on a remote file server (not shown) or on other devices. Application programs 40–48, storage module 3, search module 5, and OS 7 are executed by CPU 30, and to an extent control the operation of computer system 1 in cooperation with other components such as CPU 30.

A user uses pointing device 58 to manipulate objects, such as cursors or selection devices, which are displayed by an application 40–48 or OS 7 on monitor 50. Various methods of allowing a user to interface with applications using a pointing device are known and may be implemented in a number of ways.

Modem/network connection 54 interfaces with other computer systems by, for example, E-mail, the Internet, or a network, and may interface with other computing devices, for example a personal digital assistant (not shown) or a digital camera (not shown). Modem/network connection 54 may comprise a plurality of devices and connections.

In an exemplary embodiment storage module 3 runs continually in the background, accepting information and data from certain of application programs 40–48, and may be activated and brought to the foreground by a user when a user wishes to store an image. Storage module 3 may accept information on files to be stored, may extract information from the files themselves, and stores associative information particular to the user and the context of the storage of the file, and possibly the file itself, on computer system 1. The associative information allows the user to later search for the file using search module 5, based on information which is relevant to the user, such as the date of the storage of the file or a particular set of features the image has.

Storage module 3 and search module 5 may be implemented by, for example, a series of instructions stored on disk drive 60 or RAM 34. However the system and method of the present invention may be implemented by other methods without affecting the overall operation or benefits of the network of the present invention. Storage module 3 and search module 5 may be implemented in, for example, compiled C++ code; alternate methods of implementing storage module 3 and search module 5 are possible.

Alternate embodiments may achieve the benefits of the system and method of the present invention without the use of the specific modules and data structures described herein. For example, associative metadata may be created entirely by a user, without the automatic operation of a storage module. The associative metadata may be stored in any structure.

Figure 3:
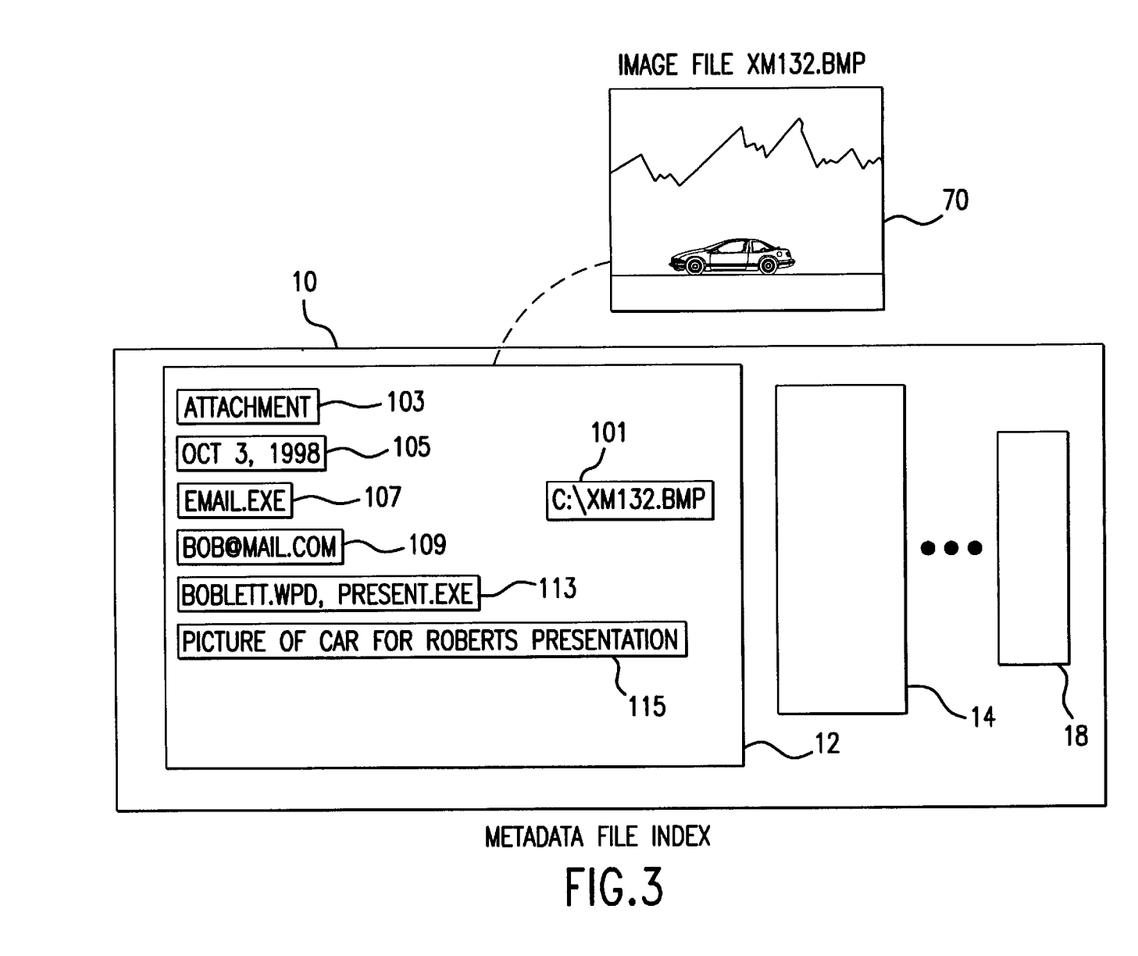
FIG. 3 is a block diagram illustrating the metadata file index of FIG. 1 according to an embodiment of the present invention.

FIG. 3 is a block diagram illustrating metadata file index 10 of FIG. 1 according to an embodiment of the present invention. Metadata file index 10 stores associative information files 12–18. Associative information file 12 is associated with, and provides information useful for searching on, file 70. Other of associated information files 12–18 correspond to other of files 70–74 and have the same structure (but different information) as associative information file 12. Associative information file 12 includes a filename 101, recording the location on computer system 1 of file 70, a title 103, the title of the image in file 70, a date 105, recording when file 70 is initially stored, a source type 107, indicating the source for file 70, a source address 109, indicating an address, which may take various formats, of a source for file 70, a list of associated files/applications 113, which is a list of files or applications a user may wish to have associated with the image in file 70, and a user summary 115. Alternate embodiments may use different structures for a metadata file index, and may not require the use of a metadata file index.

In an exemplary embodiment of the present invention, all information in associative information file 12 other than date 105 is stored as text information; date 105 is stored in a date format. Filename 101 may include a path and a disk drive designation for disk drive 60 or a different file storage system (not shown), such as a file storage system stored on a remote server. For example, filename 101 may include a disk drive specification such as "c:" or a path specification such as "\docs\pics\". Title 103 is extracted automatically from the application program which may be the source of file 70 and may be blank or null if, for example, the image file was input via scanner 52. Source type 107 records the filename of the application which accepted the image file as an input to computer system 1. Source address 109 is an indication of the source location of file 70, for example, a website or E-mail address, and may be blank in some cases, for example if file 70 is input by scanner 52.

The list of associated files/applications 113 comprises a list of filenames of applications or of other files, for example documents or presentations, that a user wishes to be associated with the image in file 70. List of associated files/applications 113 comprises strings of text delimited by, for example, commas.

Alternate embodiments may use other methods to store associative information, may use other formats for associative information, may use other categories of associative information, and may not require the use of an associative information file.

IV. Storage

In an exemplary embodiment of the present invention, storage module 3 creates associative information files aiding the storage of and search for files containing, for example, image data. A file enters computer system 1 via one of application programs 40–48, which has been registered with storage module 3. Alternatively, the application program sends information on the file to storage module 3. A user may use storage module 3 directly to input a file. Storage module 3 may request that the user enter user generated information describing the file. If storage module 3 stores the image the user may be requested to enter preferences for feature extractors which are to be run on the file. Any feature extractor having a non-zero preference rates an aspect of the image and returns an absolute value which is modified by a preference. Absolute values are stored in a feature index.

Through some combination of automatic storage module action and user action associative information is generated for the file being stored. If the file was input via an application program 40–48, this process may be completely transparent to the user. User created associative information, storage module generated associative information, user preferences, the feature index, and the file filename are saved in an associative information file stored in metadata file index 10. Other embodiments may associate the file with the associative information file in other manners; for example a pointer to the file may be used.

The set of absolute values may be used during a search for the file. Applying feature extractors at t he time of storage allows for quicker searching for these files, as feature extractors do not have to be run on the actual files at search time.

While an exemplary embodiment of the present invention allows for the use of associative information relating to image files, other embodiments may allow for associative information to be used on files other than image files, such as text files. For example, in an embodiment of the present invention allowing for the search for text files stored in disparate locations on a computer system, associative information may include information on the file source, title, date, summary, output from feature extractors operating on text files, and other information.

In an exemplary embodiment, application programs (such as application programs 40–48) passing data used to generate associative information to storage module 3 must be registered with storage module 3 in order to exchange data on file input with storage module 3. By registering, when application programs input a file to the system and store that file on the system, storage module 3 is automatically, without user intervention or initiation, passed information on the file.

Figure 4:
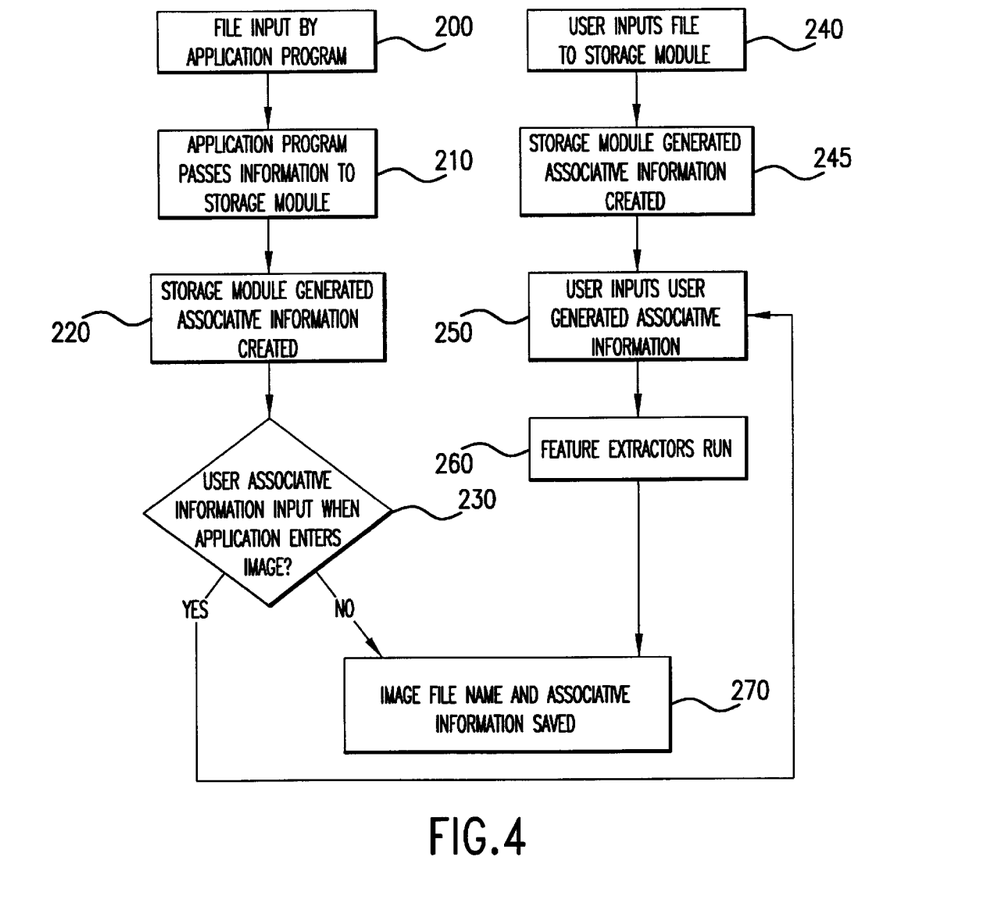
FIG. 4 is a flow chart illustrating the operation of the storage module of FIG. 1 according to an embodiment of the present invention.

FIG. 4 is a flow chart illustrating the operation of storage module 3 of FIG. 1 according to an embodiment of the present invention. The operation of storage module 3 may be started either by a file being input into one of application programs 40–48 (step 200) or by a user inputting a file directly into storage module 3 (step 240). In an exemplary embodiment, this file is a graphical interface format, bitmap, tagged image file format or JPEG file; other embodiments may work with image files in other formats. Methods of creating, displaying and processing such image files are well known in the art. The image in the file is displayable on monitor 50 and is stored as a file on disk drive 60. Alternately, the file may be stored on another device such as a file server.

Referring to FIG. 4, in step 200, a file containing an image is input into computer system 1 by an application program (of applications 40–48) registered with storage module 3. An image file input into an application may be, for example, received via E-mail. The application program stores the image in a file on computer system 1. The application program may be modified through known methods to allow its interface with storage module 3. Alternate embodiments may use sources for files and images other than application programs.

In step 210, the application program automatically passes certain information (generally information describing the context of the file's storage) to storage module 3. In an exemplary embodiment this information includes the date of the file storage, the source type (e.g., E-mail attachment, website, personal digital assistant, etc.), a title, and a source address (e.g., sender address in E-mail or website address). The application program may be, for example, a web browser (where the source of the file is a website), an E-mail program (where the source is an E-mail attachment), or an interface with, for example, a personal digital assistant, a digital camera or scanner 52. The application program recognizes and reacts to the image file based on the suffix of the filename, e.g., .bmp or gif. In an exemplary embodiment, this information is sent using the Microsoft® Message Queue ("MSMQ") feature of Microsoft's® Component Object Model ("COM"). In other embodiments, different methods of allowing applications and modules to exchange information on files being stored may be used.

In step 220 storage module 3 uses the information passed in step 210 to generate storage module generated associative information describing the image stored in the file. In an exemplary embodiment, with the exception of the date, associative information is stored by storage module 3 as text information; the date is stored in a date format. All other associative information is stored as text strings. For example, if the file to be stored is provided by an E-mail program having an executable file named "email.exe", this string is stored as associative information; if the file is input directly to storage module 3, the executable name for storage module 3 is stored. Storing data in a certain format, and converting data from one format to another, is known in the art. For example, it is well known to store dates and times as standard formats, and to convert dates and times between formats.

In step 230, if storage module 3 has been pre-configured to allow user generated associative information, including preferences (which result in feature extractors being run), to be input as associative information when used in conjunction with application programs 40–48, computer system 1 proceeds to step 250; if storage module 3 is not displayed and accessible by the user it must be brought to the foreground. If storage module 3 has not been pre-configured in this manner, computer system 1 proceeds to step 270.

Storage module 3 may also operate using an image previously stored as a file on computer system 1. For example, a file transferred by a copy operation or by a non-registered application may exist on computer system 1.

In step 240, a user inputs a file containing an image to storage module 3. The user may input an image file directly into storage module 3, by, for example, dragging an icon associated with the image file over the icon associated with storage module 3. Such an operation is depicted with respect to FIG. 5.

Figure 5:
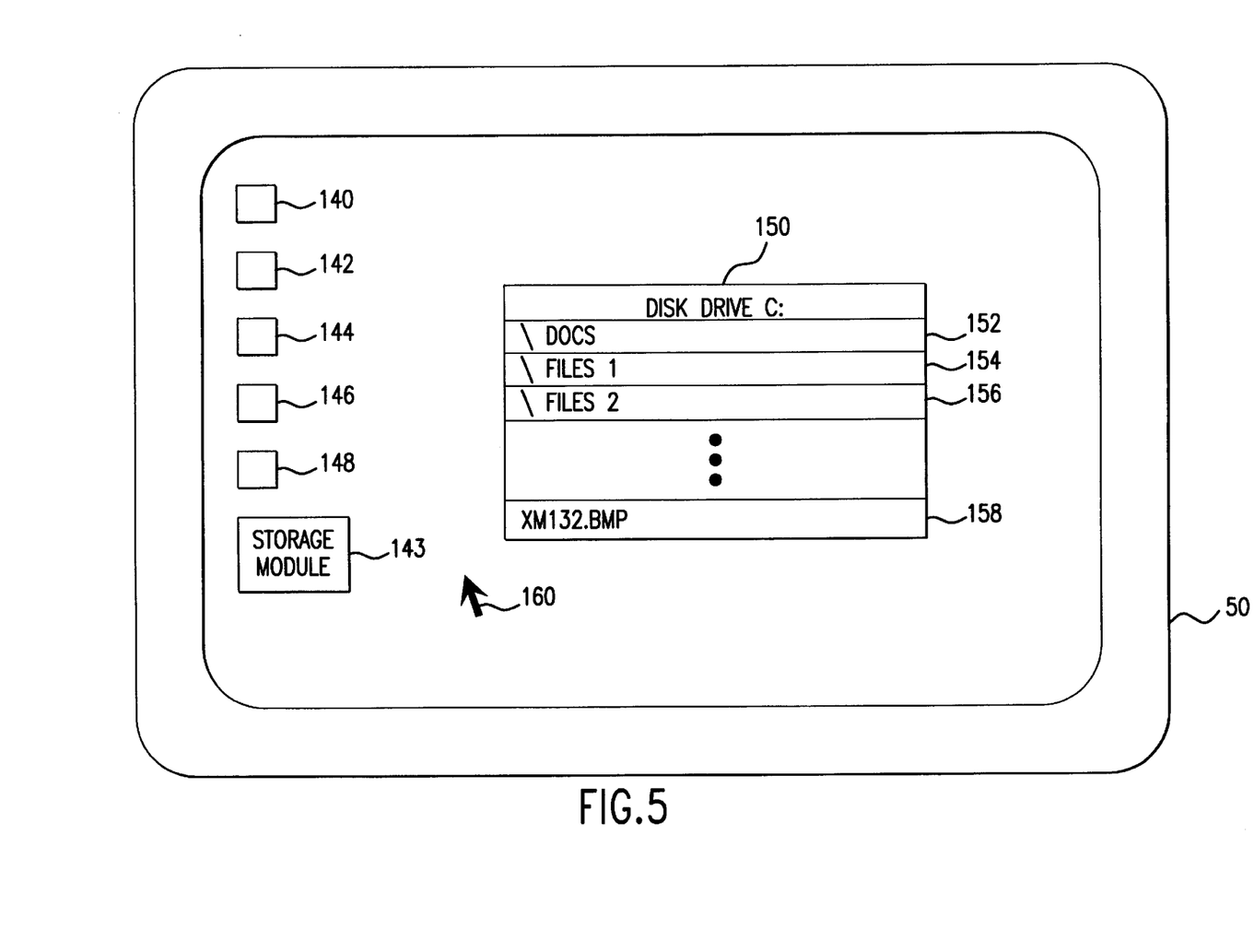
FIG. 5 is a diagram showing a screen displayed by the monitor of FIG. 1 according to an embodiment of the present invention.

FIG. 5 is a diagram showing a screen displayed by monitor 50 of FIG. 1 according to an embodiment of the present invention. Referring to FIG. 5, monitor 50 displays icons 140, 142, 144, 146, and 148, corresponding to application programs 40–48, icon 143, corresponding to storage module 3, disk drive window 150, displaying information on the contents of disk drive 60, and pointer 160, manipulated by pointing device 58 (FIG. 1). Disk drive window 150 has entries 152, 154, 156 and 158 corresponding to directories on disk drive 60. Pointer 160 is capable of manipulating objects 140–158 displayed by monitor 50. Entry 158 displays the filename corresponding to file 70 (FIG. 1). To input file 70 to storage module 3, the user uses pointing device 58 (FIG. 1) to manipulate pointer 160 and drag entry 158 over storage module icon 143; the user drops entry 158 on icon 143. Methods of manipulating data objects on a computer system using such graphical user interfaces are well known in the art. Other embodiments do not require the use of a graphical user interface.

Alternately, the user may start storage module 3, (by, for example double clicking the icon representing storage module 3), which queries the user for the filename of the image file to be input into computer system 1. Such an image file may be from, for example, a database of stock images.

In step 245 (FIG. 4), storage module 3 automatically (i.e., with no user initiation or intervention) generates certain associative information describing the image input in step 240. In an exemplary embodiment this information is the date of the image storage. Alternate embodiments may allow for other associative information to be automatically extracted from a file entered by a user.

In step 250, storage module 3 allows the user to input user generated associative information for the file input in step 200 or 240. In an exemplary embodiment, such user generated associative information comprises a user summary and a list of associated files/applications. If storage module 3 has not generated the title, source type, or source address, the user may enter these items. The information may be input through keyboard 56 or by the use of pointing device 58 through known methods. This user associative information is stored as text strings.

In an exemplary embodiment storage module 3 prompts the user to enter a user summary, text information describing the document and the significance of the document to the user. For example, in the case of a draft chart for a presentation, the summary may be "The second draft of the production chart incorporating Bob's changes and having three colors." During a search, such summary information is searched over in the associative information file which is associated with the image file as is other text information stored as associative information.

The user may input the filenames of files (containing images or other information) or applications associated with the image file; these are stored as filenames in the list of associated files/applications. For example, a user adding an image file of a family member to computer system 1 may add the filenames of image files of other family members to the associative information for this image file, allowing a search to find images on family members in general.

In step 260, the user may select feature extractors to rate the image entered in step 200 or 240; if so the feature extractors selected by the user rate the image. Storage module 3 displays the image in the file on monitor 50. Using pointing device 58 or keyboard 56, the user highlights a portion of the image or the entire image. At least a portion of the image must be selected at save time for the feature extractors to be run at save time. The selected feature extractors are run only on the portion highlighted (possibly the whole image). The ignored, unselected portions may represent portions the user feels are not relevant to searching. For example, if the image is of a favorite car in front of a building, the user may highlight the car. The buildings are then ignored by any feature extractors run at save time.

In an alternate embodiment of the present invention, information on which portion of the image in the file was selected may be saved in the associative information file, and at search time only that portion of the image is searched over using feature extractors.

Alternate embodiments need not use derived associative information such as that generated by feature extractors. In other embodiments, where the files searched over contain data other than images, feature extractors tailored to the data may be used; in addition, different associative information derived from the files themselves may be used. For example, if the files contain text documents, feature extractors may produce automatically derived keywords from text documents, and associative information may include a user generated abstract.

The set of available feature extractors is presented to the user in the form of a list displayed on monitor 50. In an exemplary embodiment of the present invention, the set of feature extractors presented at storage time comprises RGB feature extractor 20, face extractor 22 running in a general mode, haze feature extractor 26 and fog feature extractor 28. Since combined feature extractor 24 comparing two images and face extractor searching 22 for a particular face require reference images for comparison, such feature extractors are used at search time, and are thus not presented to the user at storage time. Face extractor 22 running in general mode rates an image based on whether the image has any human face, but does not accept a sample image containing a face for comparison with other images. Since RGB feature extractor 20 returns three separate ratings, three preferences are allowed for this feature extractor: red, green, and blue. If any of the three are selected (using a non-zero preference) RGB feature extractor 20 is run; however, only the selected of the three components is saved in the feature index. Alternate embodiments of the present invention may use feature extractors in different ways, and may use different sets of feature extractors.

The user selects, using keyboard 56 (FIG. 1) or pointing device 58 (FIG. 1), a subset of feature extractors to run on the image in this file. In an exemplary embodiment, a slider having a –10 to 10 scale is presented next to a label for each feature extractor. A slider is a graphical device allowing a user to set a level.

Figure 6:
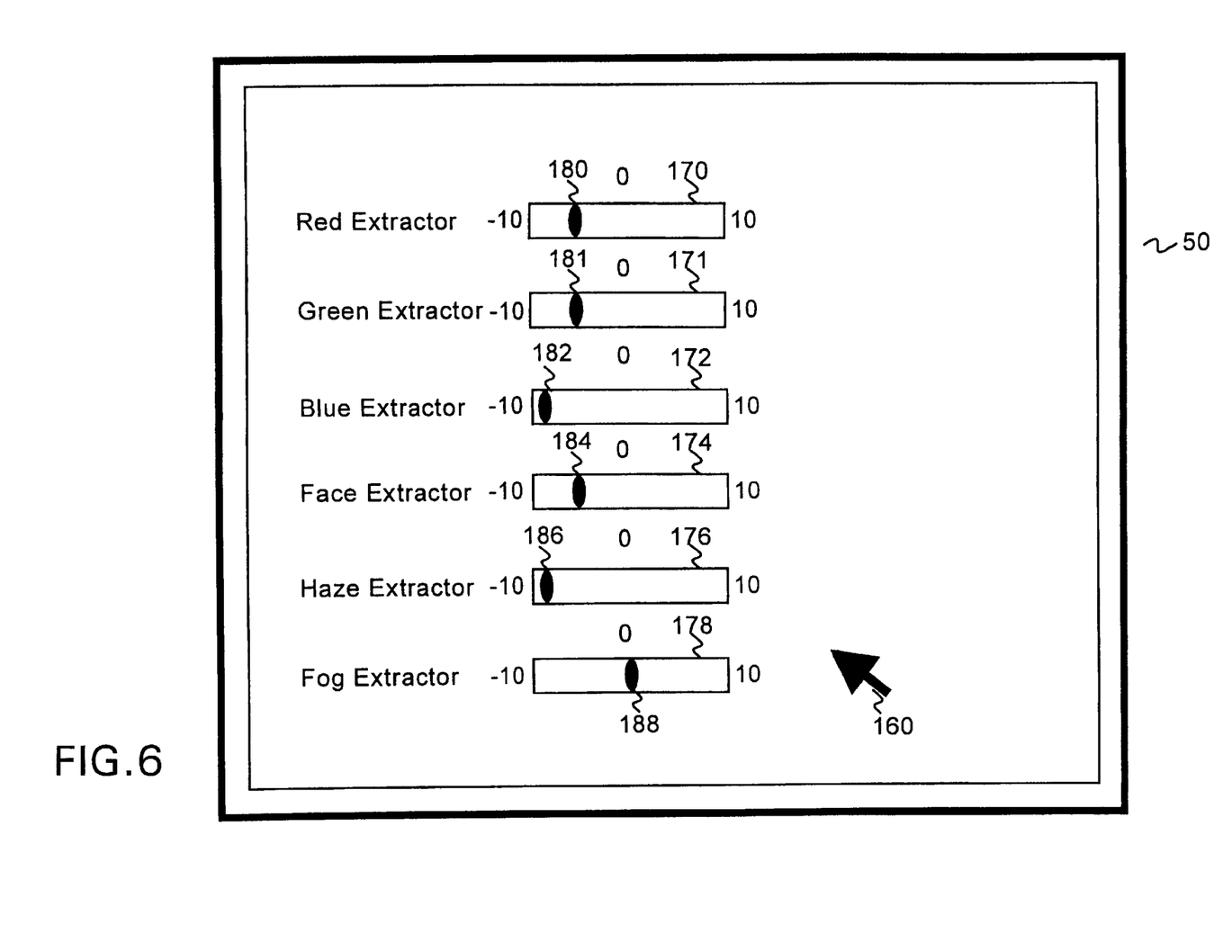
FIG. 6 is a diagram showing a screen displayed by the monitor of FIG. 1 according to an embodiment of the present invention.

FIG. 6 is a diagram showing a screen displayed by monitor 50 of FIG. 1 according to an embodiment of the present invention. To enable the user to alter user preferences, monitor 50 displays pointer 160 and sliders 170, 171, 172, 174, 176, and 178. Sliders 170–172 correspond to RGB feature extractor 20; slider 174 corresponds to face extractor 22, slider 176 corresponds to haze feature extractor 26 and slider 178 corresponds to fog feature extractor 28. Slider buttons 180, 181, 182, 184, 186, and 188 adjust the levels represented by sliders 170–178. Pointer 160, controlled by pointing device 58 (FIG. 1), is capable of manipulating sliders buttons 180–188 displayed by monitor 50. Slider buttons 180–188 may also be manipulated by keyboard 56 (FIG. 1). The user moves one of slider buttons 180–88 to indicate a user preference of –10 to 10 for the feature extracted by the feature extractor corresponding to the slider.

A preference of 0 indicates the associated feature extractor is not to be run at storage time; the default on each of sliders 170–178 when presented to the user is 0. Preferences are not entered for non-feature extractor associative information, such as the date or source. For example, in the present example, the user may indicate that a blue content is very important to a search on the image in this file by moving the slider next to "Blue" to a feature preference level of 10. When the image is searched over, whether or not this image contains blue is given more weight than other search criteria. In an alternate embodiment, preferences may be entered for non-feature extractor data; the preferences are used in a similar manner to that of preferences used for feature extractor data.

Storage module 3 passes the selected part of the image in the file (which may be the whole image) to the selected feature extractors along with the preferences for those feature extractors. In an exemplary embodiment, this information is sent using the MSMQ feature of Microsoft's® COM. In other embodiments, different methods of transmitting information among modules may be used. The subset of selected feature extractors are run on the image. Each feature extractor rates the image based on the purpose of the feature extractor on a 0 to 10 scale, modifies this rating according to the preference, and returns an absolute value. To modify the rating, the preference is converted to a positive or negative percentage; the preference is converted to a negative 100% to positive 100% modifier. The rating is multiplied by the preference to produce an absolute value. For example, if face extractor 22 running in general mode is selected by the user with a preference of 7, and a rating of 6 is generated indicating the likelihood that the image portion sent to the face extractor has a face, the rating is modified based on the preference converted to a percentage (in the case of a preference of 7, 70%), and the absolute value, 4.2, is returned. Alternate methods of combining preferences with feature extractors may be used.

The absolute values are stored in a feature index, a data object storing the absolute values of the results of the feature extraction. Each value is absolute in that it describes a feature extraction based on one particular image only, not based on the image relative to any other image. The absolute values are positive or negative numbers (modified by user preferences) indicating the presence of the relevant feature in the selected portion of the image. In an exemplary embodiment, feature extractors need not be run at save time; thus the feature index for this image may be empty.

In an exemplary embodiment of the present invention, feature extractors may also be run at search time. The user specifies whether the search criteria based on feature extractors should be run on metadata file index 10 or should be used to search over files 70–74.

In step 270, the filename and the associative information for the image in the file are saved in an associative information file. The filename is stored as a text string, enables the actual file to be retrieved when a reference to the file appears in a query result, and may be searched over by a user query in the same manner as other associative data. In an exemplary embodiment the associative information comprises the filename, the feature index, any storage module generated associative information, and any user generated associative information. The associative information file is used by search module 5 to search for files. Depending on how a file was stored, certain elements of the associative information may be null.

The associative information file is stored in metadata file index 10, a centralized data structure storing all associative information files for files entered in conjunction with storage module 3. When a search is performed for files, such as images, metadata file index 10 is referenced. While an exemplary embodiment is described with reference to a certain sequence of steps, other sequences of steps may be used to achieve other embodiments of the system and method of the present invention.

Alternate embodiments may use different formats for the storage of associative information. In alternate embodiments other information may be stored as associative information; for example the text of the E-mail to which the file is attached (if applicable) or a user identification of a person storing the file.

In an alternate embodiment associative information may include data on edits to or accesses of the stored files. In such an embodiment, when a file which has been stored in conjunction with storage module 3 is subsequently edited or accessed by an application program, an indication of the application, the date, and possibly other information are stored in the associative information file corresponding to the stored file.

V. Searching

In an exemplary embodiment of the present invention, search module 5 allows searching on files which have been indexed using storage module 3. Search module 5 allows the user to enter a query comprising associative information (which may include user generated associative information, storage module generated associative information, or feature extractor preferences) and possibly inputs to feature extractors. If non-zero preferences are entered at search time feature extractors are run, and may require the user to enter information, such as a reference image or a string of text to be searched. Of the numerous types of associative information available, only certain fields need to be entered.

The information entered by the user at search time may be any information associated with a file, whether user generated or storage module generated. If the user enters preferences, the user may specify that they are to be used to search associative information files for stored absolute values or to have feature extractors run on the stored files themselves; absolute values are returned from associative information files or feature extractors. Search module 5 generates a query rating, a number, for all files searched over. For each file, the query rating is increased by any hits (matches between a query item and an item of associative information associated with a file) occurring based on associative information in the query, and the query rating is modified by any absolute values generated. Each item of associative information in the query which matches associative information associated with a stored file alters the query rating of that file. Search module 5 returns a ranked list of files based on the query rating; the higher the query rating, the higher the file on the list of returned files.

While an exemplary embodiment of the present invention allows for search module 5 to search for images, other embodiments allow for search module 5 to search for files containing other than image information. For example, in one embodiment search module 5 may search over a set of text files using associative information and text search methods.

Figure 7:
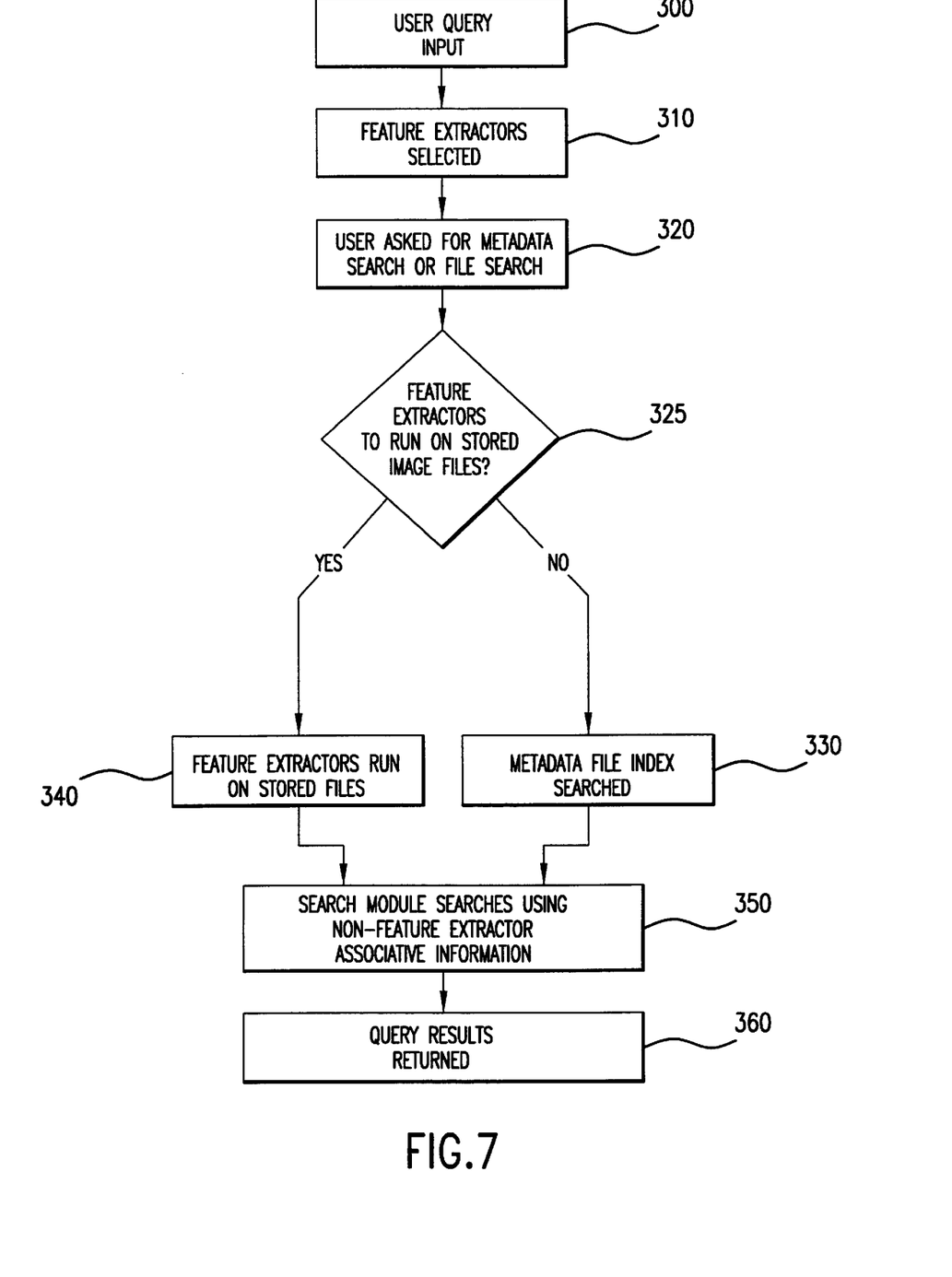
FIG. 7 is a flow chart illustrating the operation of the search module of FIG. 1 according to an embodiment of the present invention.

FIG. 7 is a flow chart illustrating the operation of search module 5 of FIG. 1 according to an embodiment of the present invention.

Referring to FIG. 7, in step 300, search module 5 requests that a user provide a query which comprises non-feature extractor associative information, items such as a file source or a phrase contained in a summary. Any of such items of information may be entered, and the user may opt to not enter any such information. In an exemplary embodiment, except for the date, the user does not enter such information with modifiers which delineate the category or type of each item of information. The user enters the date delineated by a category, e.g., "date (Mar. 12, 1997)". The date may be entered in any of a number of formats; such entries are parsed and converted to a standard format for searching.

In step 310, search module 5 requests the user to select feature extractors for the query; the user is not required to select any. The set of available feature extractors is presented to the user in a list displayed on monitor 50. In an exemplary embodiment of the present invention, the set of feature extractors presented at search time comprises RGB feature extractor 20, face extractor 22, combined feature extractor 24 comparing two images, haze feature extractor 26 and fog feature extractor 28. Since the face extractor 22 available at search time may search for a particular face using a reference image or may rate an image on whether the image has any human face (i.e., general mode), two preferences are presented for this feature extractor: general mode and comparison mode. The mode in which face extractor 22 is run, general or comparison, depends on which preferences are non-zero. Since RGB feature extractor 20 returns three ratings, three preferences are allowed for this feature extractor: red, green, and blue. If any of the three is selected (using a non-zero preference) RGB feature extractor 20 is run; however, only the selected of the three components is used for searching. In alternate embodiments, other sets of feature extractors may be used.

In an exemplary embodiment, a slider having a −10 to 10 scale is presented next to a label for each feature extractor. Using keyboard 56 or pointing device 58, the user moves the slider button to indicate a number from −10 to 10 corresponding to the user preference for the corresponding feature extractor. A preference of 0 indicates the feature extractor is not part of the query; the default is 0. Each preference is used to weigh the feature extraction associated with the preference during the search. Preferences are not entered for non-feature extractor associative information; in an alternate embodiment, preferences may be entered for non-feature extractor data.

In step 320 search module 5 asks the user whether the metadata file index 10 should be searched for absolute values or should be used in conjunction with a feature extractor search over the stored files. A field for the user to indicate this is displayed on monitor 50, and the user indicates an option using keyboard 56 or pointing device 58. A search on metadata file index 10 is quicker, as the stored files for which associative information exists do not have to be accessed and analyzed, but such a search may be less complete. Feature extraction information which is compiled when files are stored excludes comparative feature extraction, such as information comparing two images. Thus inputs geared towards such feature extraction may only be used if feature extractors are to be run on the actual stored files rather than metadata file index 10.

In step 325, if metadata file index 10 is to be searched for absolute values, search module 5 proceeds to step 330; if the feature extractors are to run on the set of files themselves, the preferences are passed to each selected feature extractor (those having non-zero preferences) and search module 5 proceeds to step 340.

In step 330, the metadata file index 10 is searched over for feature extractor absolute values created during storage and the query ratings may be modified. In an exemplary embodiment search module 5 accesses absolute values in metadata file index 10. For certain stored files, features associated with certain preferences may have had no absolute value generated at storage time; if so no rating for this file and preference are returned. Thus such a search is quicker but less complete than one applying feature extractors to actual stored files. In an exemplary embodiment neither the face extractor 22 running in comparison mode nor combined feature extractor 24 save absolute values at storage time.

To perform a search over the actual stored files, search module 5 accesses the associative information files in metadata file index 10 and searches for absolute values created at storage time by feature extractors corresponding to preferences which are non-zero as defined in step 310. If, for an associative information file associated with a particular stored file, an absolute value associated with a non-zero preference (entered in step 310) is found, the absolute value is compared with a threshold value and, if the magnitude of the absolute value is at least that of the threshold on the relevant scale (positive or negative), this absolute value modifies the query rating of the relevant file. To calculate the threshold, the preference entered in step 310 is converted to a percentage and used to modify the highest value (in an exemplary embodiment, 10) which the feature extractor associated with the non-zero preference may return. If the search preference is negative the threshold value is also negative. If magnitude of the stored absolute value for this feature is at least that of the magnitude of this threshold (and both are either positive or negative) the absolute value modifies the query rating. A negative stored absolute value exceeds the threshold only if the threshold is also negative. In an alternate embodiment other methods may be used to search on absolute values stored in associative information files.

In step 340, the selected feature extractors (those having non-zero values input in step 310) are run on the actual stored files and the query ratings may be modified. In an exemplary embodiment, each selected feature extractor accesses each associative information file in metadata file index 10 for the filenames of each stored file and accesses each stored file. Each file is read from storage (e.g., on disk drive 60) and rated by the feature extractor.

Certain feature extractors which have been selected to be run at search time by being given non-zero preferences may require inputs in order to rate images. Face extractor 22, searching for a particular face in comparison mode, and combined feature extractor 24, comparing two images, require a reference image. The image may be input to the system by the user in any number of ways, or may be existing as a file on computer system 1. For example, the user may scan in an image of a face to a file for use in face extractor 22. In an exemplary embodiment, if a feature extractor needs an input, the feature extractor requests a filename corresponding to the input from the user. The feature extractor accesses this file. In other embodiments, the feature extractor may request the sample image in another manner.

Each feature extractor runs on each stored file, calculates a rating, modifies the rating based on the preference to produce an absolute value, and modifies the query rating for the relevant stored file by this absolute value. The rating produced by the feature extractor is modified by the preference as converted to a percentage. User entered preferences are on a negative 10 to positive 10 scale, and signify not only that a feature extraction rating is of a certain importance, but that the rating should either increase or decrease the query rating for images based on the magnitude of the absolute value. For example, a preference of −8 combined with a rating of 9 produces an absolute value which decreases the query rating of an image by 7.2. RGB feature extractor 20 returns three ratings, one for each of red, green and blue; these ratings are modified by three different preferences. Since the actual stored files are accessed, such a search is slower but more complete than one applying feature extractors to the associative information files only. Other embodiments may use preferences and feature extractors in other ways, and may not use preferences and feature extractors.

In step 350 search module 5 searches using non-feature extractor associative information which the user may have entered for the query in step 300 with associative information in metadata file index 10. In an exemplary embodiment, all non-feature extractor associative information, except for the date, is stored as and searched as text information. No categories divide the search; thus a query element (a component of a query) the user may have entered for one category of information may return a hit for data entered for another category. For example, if a user enters "Bob" as a search term, the summary is searched for "Bob", as is the source information (the source may have been an E-mail from Bob Smith), the filename for the stored file (the filename may be "bobchart.bmp"), and other text information. A date may have been entered in any of a number of formats; such information is parsed, converted to a standard format, and searched over the associative information files. Methods for searching information in various formats (such as text information or a date code) over a series of files are known. If a hit occurs on a non-feature extractor query item, a rating of 10 is returned for that item; the rating is not modified by a preference, and this rating increases the query rating for the associated stored file. The rating is used by search module 3 to alter the query rating for the relevant stored file.

In step 360, the query results are returned to the user; a ranked set of references to stored files is presented on monitor 50. In an exemplary embodiment each reference is a filename referring to a file containing an image. The filename is used to locate the file corresponding to the reference, which may be stored on disk drive 60 or on another file storage device. Other information may be presented with each reference; for example a reduced representation of an image, a title, or a summary. A user may determine if the search has produced a desired image by accessing the file corresponding to a reference by, for example, using pointing device 58 to double click on the reference. Methods of displaying images and responding to a pointing device selecting a block of text are well known.

The list of returned files is a list ordered in descending order by the query ratings. Due to the method of weighting associative information, a query rating may be negative; in an exemplary embodiment only image files having a query rating greater than 0 are returned. In an alternate embodiment, the user may provide an indication of the number of images, n, which should be returned as a query result. References to the n images having the highest query rating are returned as the query result.

Since a search not accessing the actual stored files themselves may not be as accurate as one accessing the stored files, a user may run a search using the latter method if one using the former method is not successful. In an alternate embodiment of the present invention, search module 5 first searches over stored files and returns a result; if the result is not satisfactory the user may request search module 5 to search over the stored files themselves.

VI. Conclusion

Several embodiments of the present invention are specifically illustrated and/or described herein. However, it will be appreciated that modifications and variations of the present invention are covered by the above teachings and are within the purview of the appended claims without departing from the spirit and intended scope of the invention.

What is claimed is:

1. A method for storing a file to enable searching comprising:

storing the file in a set of files;

extracting a set of context information from the file during the step of storing the file in a set of files;

storing the set of context information in a set of associative information;

deriving feature information from a set of features contained in the file during the step of storing the file in a set of files;

storing the feature information in the set of associative information; and storing a reference to the file in the set of associative information.

2. The method of claim 1, wherein deriving feature information from the file comprises at least:

inputting a set of preferences, each preference associated with a feature extractor in a set of feature extractors;

applying a subset of the set of feature extractors to the file to produce a set of ratings;

modifying each rating by the preference associated with the feature extractor producing that rating; and storing the set of modified ratings in the set of associative information.

3. The method of claim 2, where each preference determines whether or not a feature extractor associated with the preference is applied to the file.

4. The method of claim 3 further comprising the step of storing user entered context information in the set of associative information.

5. The method of claim 4, where the files are images.

6. The method of claim 1, further comprising:

accepting a user query;

applying the user query to at least one of the set of associative information and the set of files; and selecting a subset of the set of files, each file in the subset corresponding to the user query.

7. The method of claim 6, where the user query includes at least a set of preferences, each preference associated with a feature extractor in a set of feature extractors, the method further comprising the step of:

searching the set of associative information using the set of preferences.

8. The method of claim 7, where the file contains an image.

9. The method of claim 8 further comprising the step of storing user entered context information in the set of associative information.

10. The system of claim 11, where each file contains an image.

11. A system for storing files, enabling searching on the files, the system comprising:

a set of files;

an associative information database including at least a set of references, each reference in the set of references corresponding to a file, a set of subsets of context information, each subset of context information corresponding to a file, and a set of subsets of user relevant information, each subset of user relevant information corresponding to a file.

12. The system claim 11 where the associative information database further includes at least a set of subsets of absolute values, each absolute value corresponding to a feature extractor and a user entered preference, each subset of absolute values corresponding to a file.

13. The system of claim 12, further comprising:

a query module accepting a user query, applying the user query to at least one of the set of associative information and the set of files, and selecting a subset of the set of files, each file in the subset corresponding to the user query.

14. The system of claim 13, where the user query includes at least a set of preferences, each preference associated with a feature extractor in a set of feature extractors, the query module searching the set of associative information using the set of preferences.

15. A program storage device readable by a computer system, for storing a plurality of instructions for storing a file to enable searching, the plurality of instructions comprising:

instructions for storing a file in a set of files;

instructions for storing the set of context information from the file and from the storage of the file;

instructions for storing the set of context information in a set of associative information;

instructions for deriving feature information from a set of features contained in the file and corresponding to a set of user entered preferences; and instructions for storing a reference to the file in the set of associative information.

16. The program storage device of claim 15 further comprising:

instructions for applying a subset of a set of feature extractors to the file to produce a set of ratings;

instructions for modifying each rating by an associated preference; and instructions for storing each rating in the set of associative information.

17. The program storage device of claim 16, where each file contains an image.

* * * * *